United States Patent [19]

Tsukada

[11] Patent Number: 5,442,525
[45] Date of Patent: Aug. 15, 1995

[54] VEHICLE LAMP

[75] Inventor: Hiroyuki Tsukada, Isehara, Japan

[73] Assignee: Ichikoh Industries, Ltd., Tokyo, Japan

[21] Appl. No.: 174,296

[22] Filed: Dec. 28, 1993

[30] Foreign Application Priority Data

Dec. 28, 1992 [JP] Japan .................. 4-089165 U

[51] Int. Cl.⁶ .................. F21M 3/00; F21V 31/02
[52] U.S. Cl. .................. 362/61; 362/267
[58] Field of Search .............. 362/267, 282, 457, 277, 362/61, 80, 322, 428, 66, 310, 319, 323, 280

[56] References Cited

U.S. PATENT DOCUMENTS

| | | | |
|---|---|---|---|
| 4,500,946 | 2/1985 | Mikola | 362/267 X |
| 4,903,173 | 2/1990 | Mochizuki et al. | 362/282 X |
| 4,916,583 | 4/1990 | Nagasawa | 362/282 X |
| 5,111,368 | 5/1992 | Suzuki et al. | 362/61 |
| 5,138,532 | 8/1992 | Shirai et al. | 362/66 |
| 5,285,357 | 2/1994 | Makita | 362/61 |

*Primary Examiner*—Ira S. Lazarus
*Assistant Examiner*—Thomas M. Sembes
*Attorney, Agent, or Firm*—Foley & Lardner

[57] ABSTRACT

In a vehicle lamp, a lamp bulb assembly is fixed to a reflector disposed inside a housing, and current-feeding terminals extend from a base of the lamp bulb assembly and rigidly connected to a connector. There is provided a sealing member to resiliently seal a small clearance necessarily taking place between the base and connector. When the connector is fitted onto the terminals, the sealing member is resiliently deformed to cover the small clearance. Since this covering is kept, exposed portions, in the clearance, of the terminals are sealed from outside.

11 Claims, 6 Drawing Sheets

VEHICLE LAMP

BACKGROUND OF THE INVENTION a) Field of the Invention

The present invention relates to a vehicle lamp having a tiltable reflector, and more particularly to a vehicle lamp having an improved sealing structure capable of providing a positive and effective sealing of a clearance likely to be between a base of a lamp bulb assembly fixed to the reflector within a housing and a connector for electrical connection to a car battery.

b) Description of the Prior Art

Various vehicle lamps having a tiltable reflector have so far been proposed, a typical one of which is disclosed in EP-A2-0300482, for example. The conventional vehicle lamp comprises a housing open at both the front and rear ends thereof, a front lens fixed over the front opening of the housing and defining a lamp bulb enclosure together with the housing, a reflector disposed tiltably inside the lamp bulb enclosure and having a rear opening located opposite to the rear opening of the housing, a lamp bulb assembly inserted through the rear opening of the housing and fixed in the rear opening of the reflector, a synthetic rubber-made waterproof cover provided to prevent water from coming into the lamp bulb enclosure and which consists of a cylindrical portion fitted on the base of the lamp bulb assembly and a flange portion fixed to the circumferential edge of the rear opening of the housing by means of a cover holder, and a connector for electrical connection to a car battery, which is projected out of the lamp bulb enclosure from the waterproof cover and fitted on terminals extending from the base of the lamp bulb assembly.

In the vehicle lamp with the tiltable reflector, the base of the lamp bulb assembly is projected out of the lamp bulb enclosure from the waterproof cover and the plurality of terminals extending from the base of the lamp bulb assembly are securely connected in a mechanical manner to the connector. However, a small clearance necessarily exists between the rear end face of the base of the lamp bulb assembly and the connector end face opposite to the rear end face. Thus, the terminals are partially exposed in the clearance. As the exposed portions of the terminals are repeatedly applied with water drops and dried, the terminals will possibly be corroded.

SUMMARY OF THE INVENTION

The present invention has an object to overcome the above-mentioned drawbacks of the prior art by providing a vehicle lamp having a sealing structure capable of positively sealing a clearance possibly taking place between the lamp bulb assembly and connector.

The above object is attained by providing, according to the present invention, a vehicle lamp having a means of elastically covering a small clearance defined between the rear end face of a base of a lamp bulb assembly and the end face of a connector, opposite to the rear end face, to positively and effectively seal any exposed portions, within the clearance, of a plurality of terminals extending from the rear end of the base of the lamp bulb assembly.

The sealing member is preferably made of an elastic material such as EPDM having closed cells, and shaped to have the form of a hollow cylinder fittable at one end thereof on the outer circumference of the base of the lamp bulb assembly and resiliently fitted at the other end thereof on a front end of the connector. When the sealing member is fitted on the outer circumference of the base, it extends slightly rearward from the end of the base. When the connector is fitted onto the terminals, the connector end portion enters inside the extension of the sealing member which in turn will be deformed. The reaction of the sealing member against the deformation thereof causes the end face of the sealing member to be forced to that of the connector. Since the connector is rigidly fitted on the terminals, the end face of the sealing member is kept pressed to that of the connector, thereby permitting the sealing member to positively seal the clearance between the rear end face of the base of the lamp bulb assembly and the end face of the connector.

The sealing member may be shaped in the form of a cylinder closed at one end thereof and having formed therein slots in which the plurality of terminals is inserted, respectively. In this case, the terminals are rigidly fitted into the connector as projected from the bottom of the sealing member. Since the bottom of the sealing member is pressed by the end portion of the connector, the sealing member is resiliently deformed between the end of the base and connector end. The reaction of the sealing member against the deformation thereof causes the end face of the sealing member to be forced to that of the connector.

Further, the sealing member may be designed to have a bellows structure, and also it may be formed integrally with the waterproof cover.

DETAILED DESCRIPTION OF THE PREFERRED EMBODIMENTS

Figure 1:
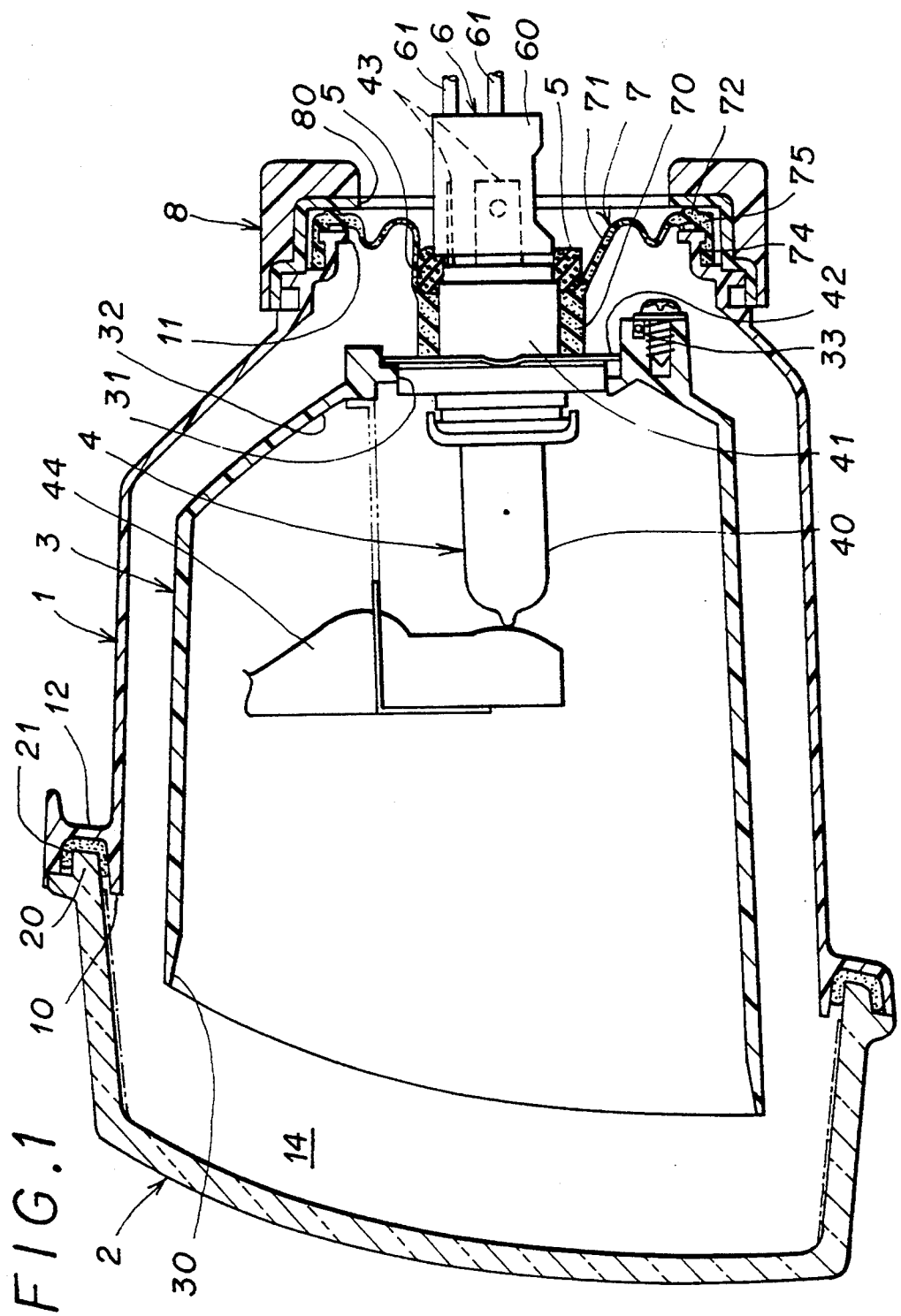
FIG. 1 is an axial sectional view of one embodiment of the vehicle lamp according to the present invention.
Figure 2:
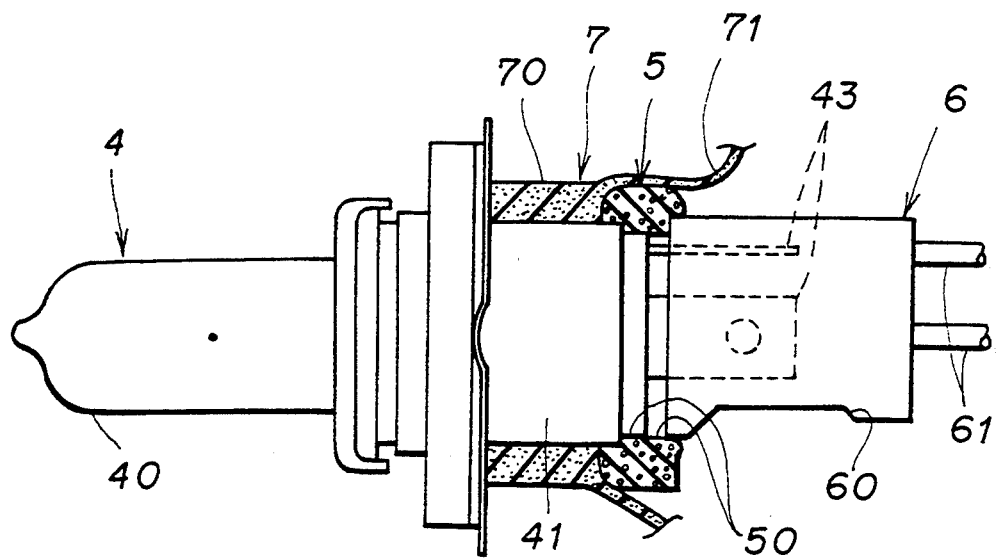
FIG. 2 is a sectional view, enlarged in scale, of the essential portion of the vehicle lamp in FIG. 1.
Figure 3:
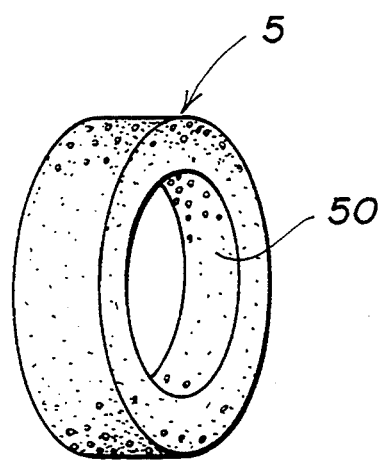
FIG. 3 is a perspective view of the sealing member.

FIGS. 1 to 3 show the first embodiment of the vehicle lamp according to the present invention.

In FIG. 1, the reference numeral 1 denotes a housing made of, for example, a synthetic resin. The housing 1 has provided at the front end thereof an opening 10 over which a lens 2 is fixed. There is provided a sealing concavity 12 at the front opening 10. The housing 1 has provided at the rear end thereof an opening 11 through which a lamp bulb is inserted into the housing 1.

The lens 2 is made of, for example, a glass. This lens 2 takes the general form of a cup open at the rear end thereof. The lens 2 has a sealing leg 20 formed integrally along the circumference of the rear opening of the lens 2. The sealing leg 20 and the sealing concavity 12 of the housing 1 are sealed with a hot melt 21 or the like, and the lens 2 is fixed over the front opening 10 of the housing 1 to define a lamp bulb enclosure 14.

In Figures, the reference numeral 3 denotes a reflector made of, for example, a synthetic resin. The reflector 3 has formed at the front end thereof an opening 30 through which the light beam is passed, and at the rear end an opening 31 in which a lamp bulb assembly 4 is installed. The reflector 3 has provided at the rear inner face thereof a reflecting surface 32 shaped in the form of a paraboloid of revolution. A spring 33 for retaining the lamp bulb assembly 4 in place, fixed at one end thereof, is fixed at the rear opening 31 of the reflector 2. Secured to the housing 1 by means of a pivot bearing (not shown) so as to be tiltable vertically and horizontally, the reflector 3 is disposed inside the lamp bulb enclosure 14.

The lamp bulb assembly 4 comprises a glass tube 40 enveloping a main filament (not shown) for emitting a light beam normally used during run of the car and a sub filament (not shown) for emitting a light beam used when the car and another car pass each other, a cylindrical base 41 formed integrally at the rear portion of the glass tube 40, a flange 42 provided in the middle of the base 41, and three terminals 43 projected rearward from the rear end of the base 41 (including a positive-pole terminal for the main filament, a positive-pole terminal for the sub filament and a negative-pole terminals common to the main and sub filaments).

The glass tube 40 of the lamp bulb assembly 4 is inserted inside the reflecting surface 32 of the reflector 3 from the rear opening 11 of the housing 1 and the rear opening 31 of the reflector 3. The flange 42 abuts the circumferential edge of the rear opening 31 of the reflector 3. The spring 33, a fixture or the like (not shown) at the lamp bulb assembly 4 and a one (not shown) at the reflector 4 are used to removably install the lamp bulb assembly 4 to the reflector 3. The reference numeral 44 denotes a shade fixed to the reflector 3 to limit the glaring light.

In Figures, the reference numeral 7 denotes a waterproof cover made by molding a rubber. The waterproof cover 7 comprises a cylindrical boss 70 having annular projections formed on the inner circumferential face thereof, an elastic bellows-like skirt 71 formed integrally with the boss 70 and extending from the outer rear circumference of the boss 70 rearward and outwardly, a flat, annular abutment 72 formed integrally with the skirt 71 and extending outwardly from the outer circumference of the skirt 71, an annular seal 74 formed integrally with the abutment 72 and extending at a right angle frontward from the outer circumference of the abutment 72, and a seal bead 75 consisting of a double annular seal bead portion and a single annular seal bead portion formed integrally with, and projecting from, the front and rear faces, respectively, of the abutment 72.

In Figures, the reference numeral 8 denotes a cap made of, for example, a synthetic resin. The cap 8 is shaped to have the form of a cup having an opening 80 in the bottom center thereof. The cap 8 is removably attached to the edge of the rear opening 11 of the housing 1 by means of a fixture or the like (not shown) at the housing 1 and a one (not shown) at the cap 8, while the abutment 72 of the waterproof cover 7, seal bead 75 and seal 74 are forced to the circumferential edge of the opening 80 of the cap 8 and that of the rear opening 11 of the housing 1. Thereafter, the boss 70 of the waterproof cover 7 is fitted on the base 41 to provide for a sealing to prevent water from coming from the rear opening 11 into the lamp bulb enclosure 14. The terminals extending from the rear end face of the base 41 are exposed outside the boss 70 of the waterproof cover 7.

The structures of the housing 1, lens 2, reflector 3, lamp bulb assembly 4, waterproof cover 7 and .cap 8 are described in detail in the previously mentioned EP-A2-0300482.

In Figures, the reference numeral 6 denotes a connector for electrical connection between the lamp bulb assembly and the car battery. The connector 6 has a body 60 made of an insulative material. The connector body 60 has formed therein at one end face (front end face) three openings (not shown) through which the three terminals 43 of the lamp bulb assembly 4 can be inserted, respectively. Further, the connector body 60 has built therein receptacles (not shown) in which the terminals 43 of the lamp bulb assembly 4 are fitted, respectively, and which are thus electrically connected with them, respectively. Cords 61 electrically connected with the receptacles are provided as led out of the connector body 60.

The terminals 43 exposed outside the boss 70 of the waterproof cover 7 are fitted into the respective openings in the connector 6 and thus removably connected to the respective receptacles built in the connector 6, so that the lamp bulb assembly 4 is connected to the car battery.

Note that there may be provided in the middle of the cords 61 of the connector a separate connector (now shown) which provides for an electrical connection and disconnection.

In Figures, the reference numeral 5 denotes a sealing member made of an elastic material such as EPDM of a closed cell structure, etc. The sealing member 5 is shaped to have the form of a hollow cylinder of which the axial length is smaller than the radial dimension. The sealing member 5 has formed in the center thereof an opening 50 in which the base 41 of the lamp bulb assembly 4 is water tightly fitted and through which the terminals 43 are passed. The sealing member 5 is formed separately from the connector 7 and waterproof cover 7.

Before the terminals 43 of the lamp bulb assembly 4 are fitted into the connector 6, they are inserted into the opening 50 in the sealing member 5, the sealing member 5 is fitted on the outer circumference of the base 41 of the lamp bulb assembly 4 in a watertight manner, and the front end of the sealing member 5 is pressed to the rear end of the boss 70 of the waterproof cover 7 in a watertight manner. In this condition, the rear end of the sealing member 5 extends somehow from the rear end of the base 41.

Thereafter, the terminals 43 of the lamp bulb assembly 4 are fitted into the connector 6, and the front end of the connector 6 is forcibly pressed to the rear end of the sealing member 5. Thus, the sealing member 5 flexes and resiliently deforms itself (compressed). The reaction of the sealing member causes the rear end of the sealing member 5 to be pressed in a watertight manner to the front end of the connector 6, thereby permitting the sealing member 5 to externally seal in a positive manner the exposed portion, in any clearance, of the terminals 43 extending from the rear end of the base 41 of the lamp bulb assembly 4. When the connector 6 is are fitted onto the terminals 43, the pressure of the connector 6 will force the sealing member 5 to the waterproof cover 7 and connector 6. As a result, the exposed portion, in any clearance, of the terminals 43 extending from the rear end of the base 41 of the lamp bulb assembly 4 can be positively sealed from outside.

In the above-mentioned embodiment, the sealing member 5 is separate from the waterproof cover 7 or connector 6, and is interposed between the waterproof cover 7 and connector 6. However, the separate sealing member 5 may be bonded, with a bonding agent, to the rear end of the boss 70 of the waterproof cover 7 and base portion of the skirt 71 thereof, or to the front end of the connector body 60. Otherwise, the sealing member 5 may be formed integrally with the rear end of the boss 70 of the waterproof cover 7 and base portion of the skirt 71 thereof, or with the front end of the connector body 60. The integral forming or molding is a so-called postforming. That is, a set of preforming dies is used to preform the waterproof cover 7 or connector 6. Then, the preformed product is set in a set of postforming dies to postform the sealing member 5 integrally with the waterproof cover 7 or connector 6.

Figure 4:
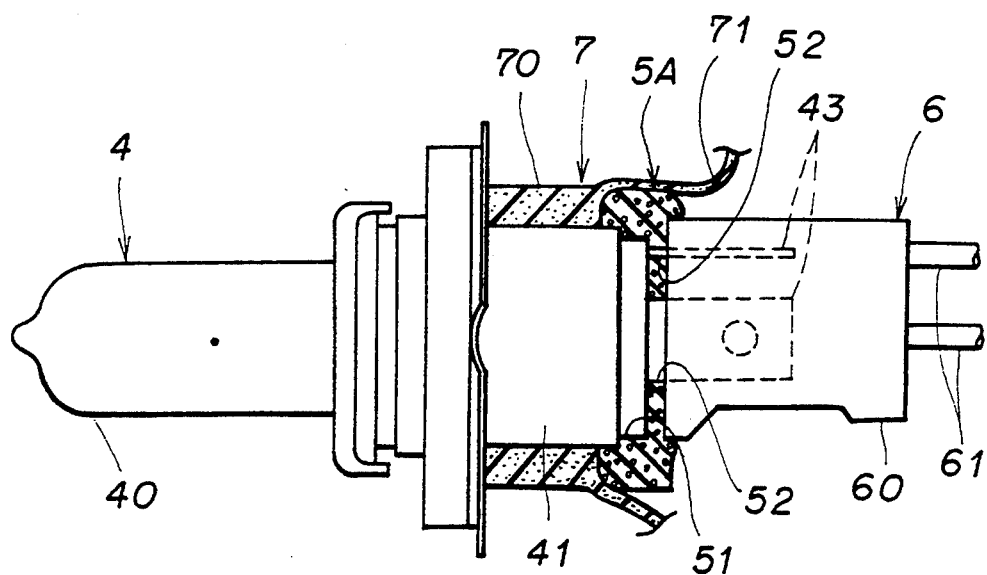
FIG. 4 is a sectional view, enlarged in scale, of the essential portion of a second embodiment of the vehicle lamp according to the present invention.
Figure 5:
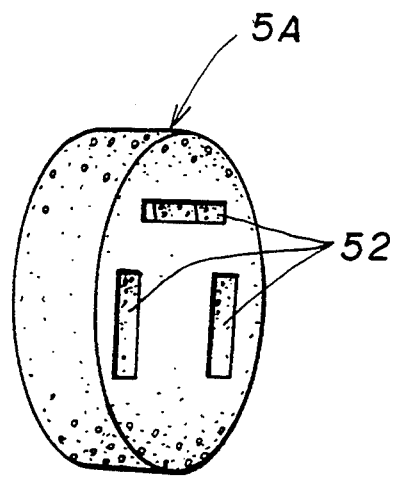
FIG. 5 is a perspective view of the sealing member.

FIGS. 4 and 5 show the second embodiment of the vehicle lamp according to the present invention. In these Figures, the same elements as those in FIGS. 1 to 3 are indicated with the same reference numerals.

This second embodiment employs a sealing member 5A which is a variant of the sealing member 5 in the first embodiment having been described in the foregoing. Specifically, the sealing member 5A is shaped to have the form of a cylinder closed at the rear end thereof. It has formed therein a bore 51 in which the base 41 of the lamp bulb assembly 4 is fitted in a watertight manner, and also having formed in the bottom or other end thereof slots 51 through which the three terminals 43 are inserted in a watertight manner. In this embodiment, the terminals 43 are projected out of the bottom of the sealing member 5A and are rigidly fitted in the connector 6. Since the bottom of the sealing member 5A is pressed by the end of the connector 6, the sealing member 5A is resiliently deformed between the end of the base 41, and the reaction of the sealing member 5A against the deformation causes the end face of the sealing member 5A to be pressed to that of the connector 6.

Figure 6:
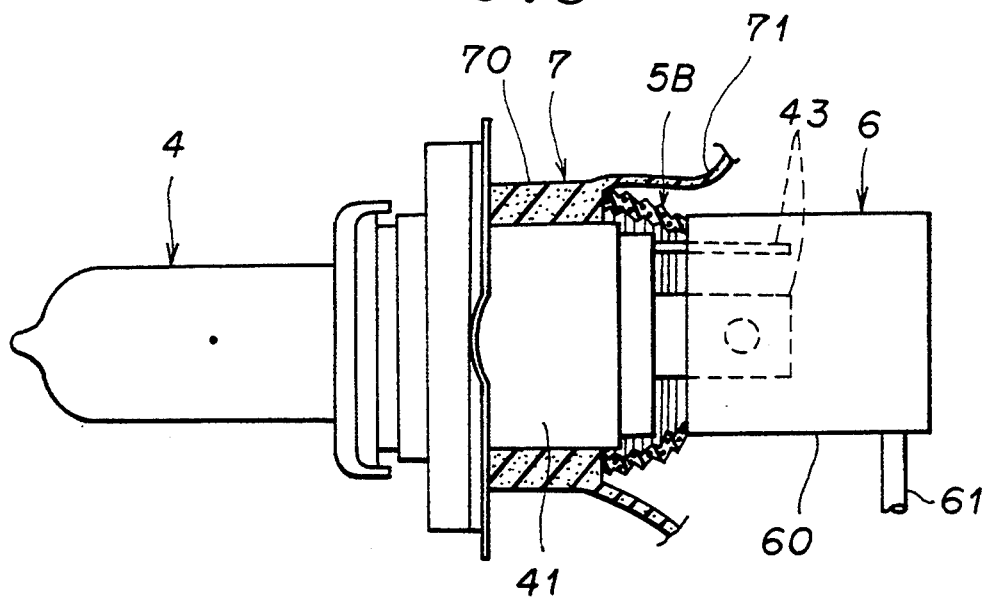
FIG. 6 is a sectional view, enlarged in scale, of the essential portion of a third embodiment of the vehicle lamp according to the present invention.
Figure 7:
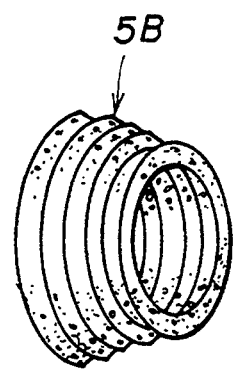
FIG. 7 is a perspective view of the sealing member having a bellows structure.

FIGS. 6 and 7 show the third embodiment of the vehicle lamp according to the present invention. Also in these Figures, the same elements as those in FIGS. 1 to 5 are indicated with the same reference numerals.

The third embodiment uses a sealing member 5B which is a variant of those in the first and second embodiments. This sealing member 5B has a bellows structure which covers the exposed portion of the lamp bulb assembly 4 between the rear end of the boss 70 of the waterproof cover 7 and the front end of the connector body 60. The sealing member 5B is formed separately from the waterproof cover 7 and connector 6.

The separate sealing member 5B is interposed between the rear end of the boss 70 of the waterproof cover 7 and the front end of the connector body 60.

Note that the separate sealing member 5B may be bonded, with a bonding agent, to the rear end of the boss 70 of waterproof cover 7 and base portion of the skirt 71 thereof or to the front end of the connector body 60.

Figure 8:
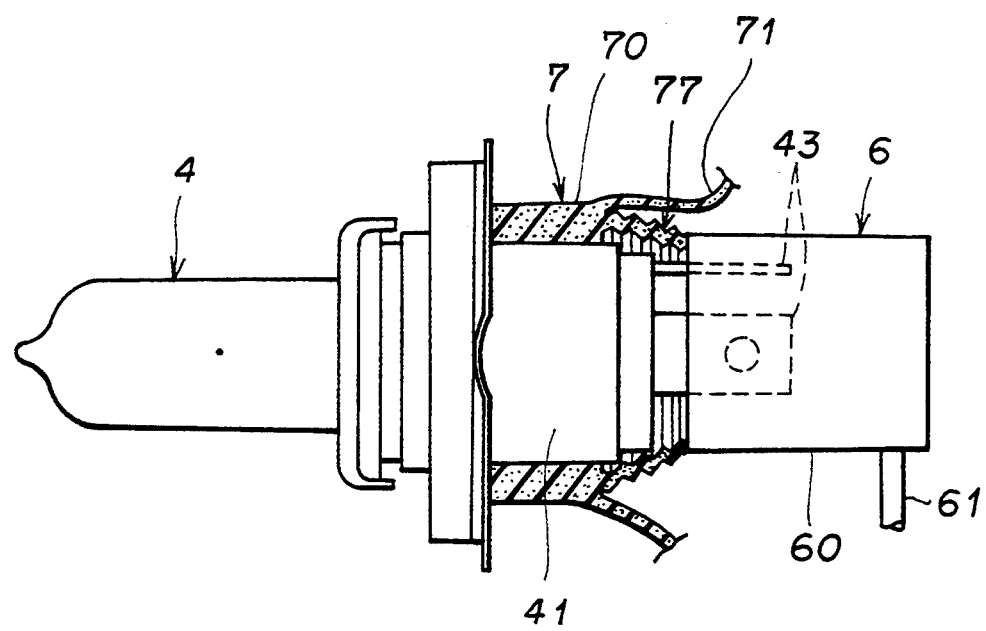
FIGS. 8 to 10 are sectional views, enlarged in scale, of the essential portion of variants of the sealing member having the bellows structure.

Also, a sealing member 77 having a bellows structure 77 as shown in FIG. 8 may be formed integrally with the rear end of the boss 70 of the waterproof cover 7 and base portion of the skirt 71.

Figure 9:
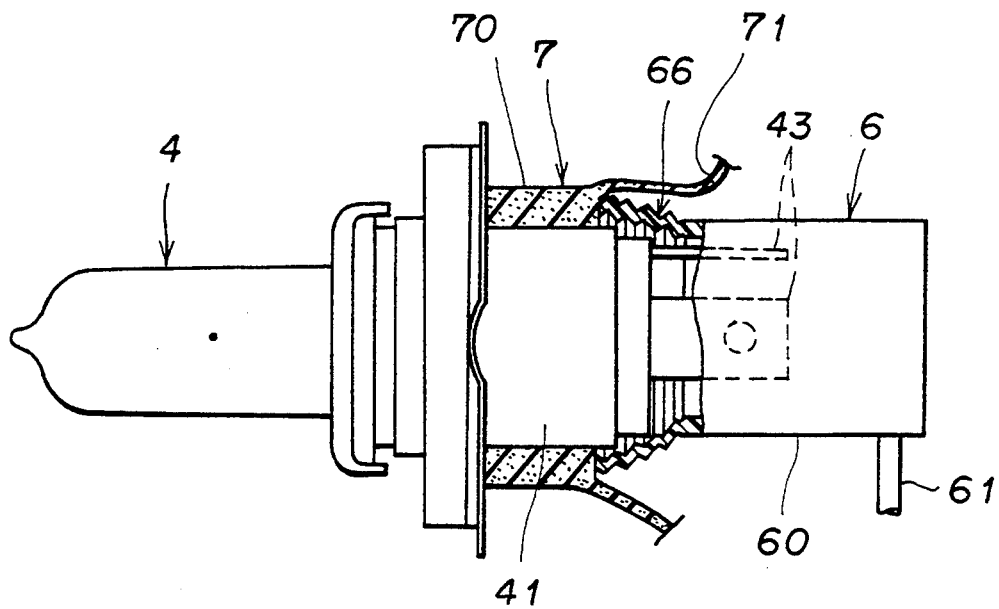
Figure 10:
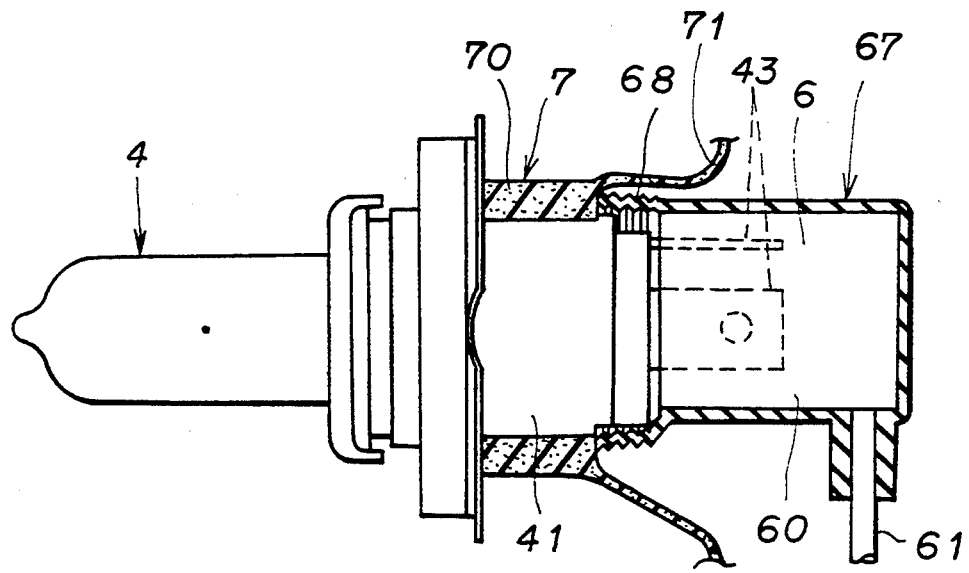

A sealing member 66 having a bellows structure as shown in FIG. 9 may be formed integrally with the front end of the connector body 60.

Furthermore, the connector 6 may be provided with a boot-like portion 67 made of an elastic material and which is fitted on the body 60 in a watertight manner and a sealing portion 68 having a bellows structure projected from, and formed integrally with, the front end of the boot-like portion 67 to cover the exposed portion, between the waterproof cover 7 and connector 6, of the lamp bulb assembly 4.

The vehicle lamps according to the aforementioned embodiments are of a type in which the cap 8 is used to fit the waterproof cover 7 in a watertight manner to the circumferential edge of the opening 11 of the housing 1 through which the lamp bulb assembly 4 is inserted. The present invention can be applied to a type of vehicle lamp in which the outer circumferential edge of the waterproof cover 7 is directly fitted in a watertight manner, namely, without using the cap 8, to the circumferential edge of the opening 11 of the housing 1 through which the lamp bulb assembly 4 is inserted.

What is claimed is:

1. A vehicle lamp, comprising:
   a housing having a front and rear openings;
   a front lens fixed over the front opening of the housing and defining a lamp bulb enclosure together with the housing;
   a reflector tiltably disposed inside the lamp bulb enclosure and having a rear opening opposite to the rear opening of the housing;
   a lamp bulb assembly including a lamp bulb, a base formed integrally with the lamp bulb, and a plurality of terminals projected from the base, the lamp bulb assembly being inserted through the rear opening of the housing and fixed to an circumferential edge of the rear opening of the reflector;
   a waterproof cover fitted in a watertight manner on the base of the lamp bulb assembly and to the circumferential edge of the rear opening of the housing;
   a connector rigidly fittable onto the plurality of terminals projected out of the lamp bulb enclosure from the waterproof cover and extending from an end of the base of the lamp bulb assembly, for an electrical connection between the lamp bulb assembly and a car battery; and
   a sealing member for resiliently sealing a clearance between the base of the lamp bulb assembly and the connector opposite to the base, the sealing member being resiliently deformed to seal the clearance when the connector is pressed against the sealing member and rigidly fitted onto the plurality of terminals.

2. A vehicle lamp according to claim 1, wherein the sealing member is made of an elastic material such as EPDM having closed cells.

3. A vehicle lamp according to claim 2, wherein the sealing member is shaped to have a form of a hollow cylinder of which one end is fitted to an outer circumference of the base of the lamp bulb assembly and an other end is resiliently fitted to a front end of the connector.

4. A vehicle lamp according to claim 2, wherein the sealing member is shaped to have the form of a cylinder open at one end thereof and closed at an other end, the sealing member being fitted at the open end thereof on an outer circumference of the base of the lamp bulb assembly and the other end having formed therein slots through which the terminals are inserted and being fitted resiliently to a front end of the connector, respectively.

5. A vehicle lamp according to claim 1, wherein the sealing member has a bellows structure which covers a conjunction between the base of the lamp bulb assembly and the connector.

6. A vehicle lamp according to claim 2, wherein the sealing member is molded integrally with the waterproof cover.

7. A vehicle lamp according to claim 5, wherein the sealing member is molded integrally with the waterproof cover.

8. A vehicle lamp according to claim 5, wherein the sealing member is bonded to the waterproof cover.

9. A vehicle lamp according to claim 2, wherein the sealing member is bonded to the connector.

10. A vehicle lamp according to claim 5, wherein the sealing member is bonded to the connector.

11. A vehicle lamp according to claim 1, wherein the sealing member comprises a boot-like portion made of an elastic material and is fitted in a watertight manner on the connector and a bellows portion projected from, and formed integrally with, the boot-like portion to cover the clearance between the base of the lamp bulb assembly and the connector.

* * * * *